United States Patent
Lin et al.

(10) Patent No.: US 8,155,858 B2
(45) Date of Patent: Apr. 10, 2012

(54) REAL-TIME DOSER EFFICIENCY MONITORING

(75) Inventors: Xiao Lin, Zionsville, IN (US); Daniel D. Wilhelm, Nashville, IN (US); Javier Franco, Columbus, IN (US)

(73) Assignee: Cummins Filtration IP, Inc., Minneapolis, MN (US)

( * ) Notice: Subject to any disclaimer, the term of this patent is extended or adjusted under 35 U.S.C. 154(b) by 1030 days.

(21) Appl. No.: 12/060,507

(22) Filed: Apr. 1, 2008

(65) Prior Publication Data

US 2009/0248359 A1 Oct. 1, 2009

(51) Int. Cl.
*F02D 41/00* (2006.01)

(52) U.S. Cl. ............ 701/103; 701/114; 73/114.69

(58) Field of Classification Search .......... 701/101–105, 701/112, 114, 115; 123/294–298, 478–480, 123/527, 531, 533; 60/274, 285–289, 295, 60/298; 73/114.69, 114.76, 700; 702/182
See application file for complete search history.

(56) References Cited

U.S. PATENT DOCUMENTS

| | | | | |
|---|---|---|---|---|
| 5,020,504 A | * | 6/1991 | Morikawa | 123/531 |
| 5,131,350 A | * | 7/1992 | Buschor | 118/308 |
| 5,259,594 A | * | 11/1993 | Mayr et al. | 266/157 |
| 5,801,308 A | * | 9/1998 | Hara | 73/223 |
| 5,832,717 A | * | 11/1998 | Halin | 60/39.281 |
| 6,484,573 B2 | * | 11/2002 | Bundock et al. | 73/114.48 |
| 6,520,769 B2 | * | 2/2003 | Tachihara et al. | 431/170 |
| 6,901,953 B2 | * | 6/2005 | D'Agostino et al. | 137/512.1 |
| 7,080,550 B1 | * | 7/2006 | Goris et al. | 73/114.48 |
| 7,878,183 B2 | * | 2/2011 | Jaloszynski et al. | 123/533 |
| 2006/0278283 A1 | * | 12/2006 | Gouzou et al. | 137/571 |
| 2008/0010975 A1 | | 1/2008 | Zhang et al. | |
| 2008/0016853 A1 | | 1/2008 | Zhang et al. | |

FOREIGN PATENT DOCUMENTS

| | | |
|---|---|---|
| JP | 56-50211 A | 5/1981 |
| JP | 07-279648 A | 10/1995 |
| JP | 2000-297706 A | 10/2000 |

OTHER PUBLICATIONS

Co-pending U.S. Appl. No. 12/206,088, filed Sep. 8, 2008.
International Search Report of PCT/US2009/033529, dated Sep. 17, 2009.
Written Opinion of the International Searching Authority of PCT/US2009/033529, dated Sep. 17, 2009.

* cited by examiner

*Primary Examiner* — John T. Kwon
*Assistant Examiner* — Johnny Hoang
(74) *Attorney, Agent, or Firm* — Hamre, Schumann, Mueller & Larson, P.C.

(57) ABSTRACT

A real time doser efficiency monitoring method is described that measures the average instant pressure difference within one duty cycle of the doser injector. The disclosed method results in improved doser efficiency monitoring. The disclosed method can be implemented in a number of areas. For example, in a diesel truck application, the doser efficiency can be monitored accurately, for example within 5% error, all the time, no matter whether the truck is in a transient or steady state.

17 Claims, 5 Drawing Sheets

REAL-TIME DOSER EFFICIENCY MONITORING

FIELD

This disclosure relates to an exhaust gas aftertreatment system and a doser system used with the aftertreatment system to inject a dosing agent into exhaust gas in the aftertreatment system.

BACKGROUND

The use of an aftertreatment system to treat exhaust gas before the exhaust gas is exhausted to atmosphere is known. One known aftertreatment system uses a diesel oxidation catalyst (DOC) device that is intended to react with the exhaust gas to convert nitric oxide to nitrogen dioxide. In the case of diesel exhaust, a diesel particulate filter (DPF) can also be provided downstream of the DOC to physically remove soot or particulate matter from the exhaust flow.

When exhaust gas temperatures are sufficiently high, soot is continually removed from the DPF by oxidation of the soot. When the exhaust gas temperature is not sufficiently high, active regeneration is used. In the case of diesel engine exhaust, one form of active regeneration occurs by injecting fuel into the exhaust gas upstream of the DOC. The resulting chemical reaction between the fuel and the DOC raises the exhaust gas temperature high enough to oxidize the soot in the DPF.

A doser system that includes a doser injector is used to inject the fuel into the exhaust gas. Deterioration of the doser injector can occur over its lifetime, for example due to doser tip carboning or a reduction of doser stroke. It is currently believed by the inventors that doser deterioration is the most frequent mode of failure in aftertreatment systems. A known doser monitoring method that attempts to determine the efficiency of the doser injector senses the temperature difference across the DOC. However, the effectiveness of this method is decreased by deterioration of the DOC which cannot be independently monitored.

SUMMARY

A real time doser efficiency monitoring method is described that measures the average instant pressure difference within one duty cycle of the doser injector. The disclosed method results in improved doser efficiency monitoring. The disclosed method can be implemented in a number of areas. For example, in a diesel truck application, the doser efficiency can be monitored accurately, for example within 5% error, all the time, no matter whether the truck is in a transient or steady state.

In one embodiment, a method of monitoring the efficiency of a doser injector that is configured and arranged to inject a dosing agent into exhaust gas comprises determining the average instant pressure difference of the dosing agent at a dosing agent shut-off valve assembly within a duty cycle of the doser injector. The doser injector is preferably pulse-width modulation controlled.

In another embodiment, a method of monitoring the efficiency of a doser injector that is configured and arranged to inject a dosing agent into exhaust gas comprises, in a single duty cycle of the doser injector, determining an average pressure of the dosing agent when the doser injector is off and determining an average pressure of the dosing agent when the doser injector is on, the pressure measurements occurring at a dosing agent shut-off valve assembly. The difference between the dosing agent average pressure when the doser injector is off and the dosing agent average pressure when the doser injector is on is then determined and used to calculate the average instant pressure difference.

The method can be implemented by a doser system that comprises a doser injector that is configured and arranged to inject a dosing agent into exhaust gas, a dosing agent supply line connected to the doser injector, and a dosing agent shut-off valve assembly connected to the supply line that is configured and arranged to control the flow of the dosing agent in the supply line and to the doser injector. The valve assembly includes a pressure sensor for detecting dosing agent pressure in the valve assembly. A controller monitors the efficiency of the doser injector, with the controller determining the average instant pressure difference of the dosing agent at the dosing agent shut-off valve assembly within a duty cycle of the doser injector.

The dosing agent can be fuel, for example diesel fuel, alcohols, urea, ammonia, natural gas, and other agents suitable for use in aftertreatment of exhaust gases.

The disclosed method can complete monitoring within fraction of seconds, which works well even during transient engine operations and dosing. The disclosed method also has increased accuracy. The average instant pressure difference is the maximum pressure drop so it has a better signal-to-noise ratio. The disclosed method is also independent of the performance, e.g. degradation, of individual aftertreatment components as is the current temperature based efficiency monitoring method. Further, the disclosed method is independent of the dosing command.

The disclosed method permits compliance with the on-board diagnostics requirement for the year 2010, which requires independent monitoring for each aftertreatment component. In addition, the higher efficiency achieved by the disclosed method reduces the injection of excess fuel, called hydrocarbon slip, thereby avoiding violation of hydrocarbon emission regulations. Further, the occurrence of false detected "bad" dosers is reduced, thereby reducing warranty costs of doser replacement.

DETAILED DESCRIPTION

Figure 1:
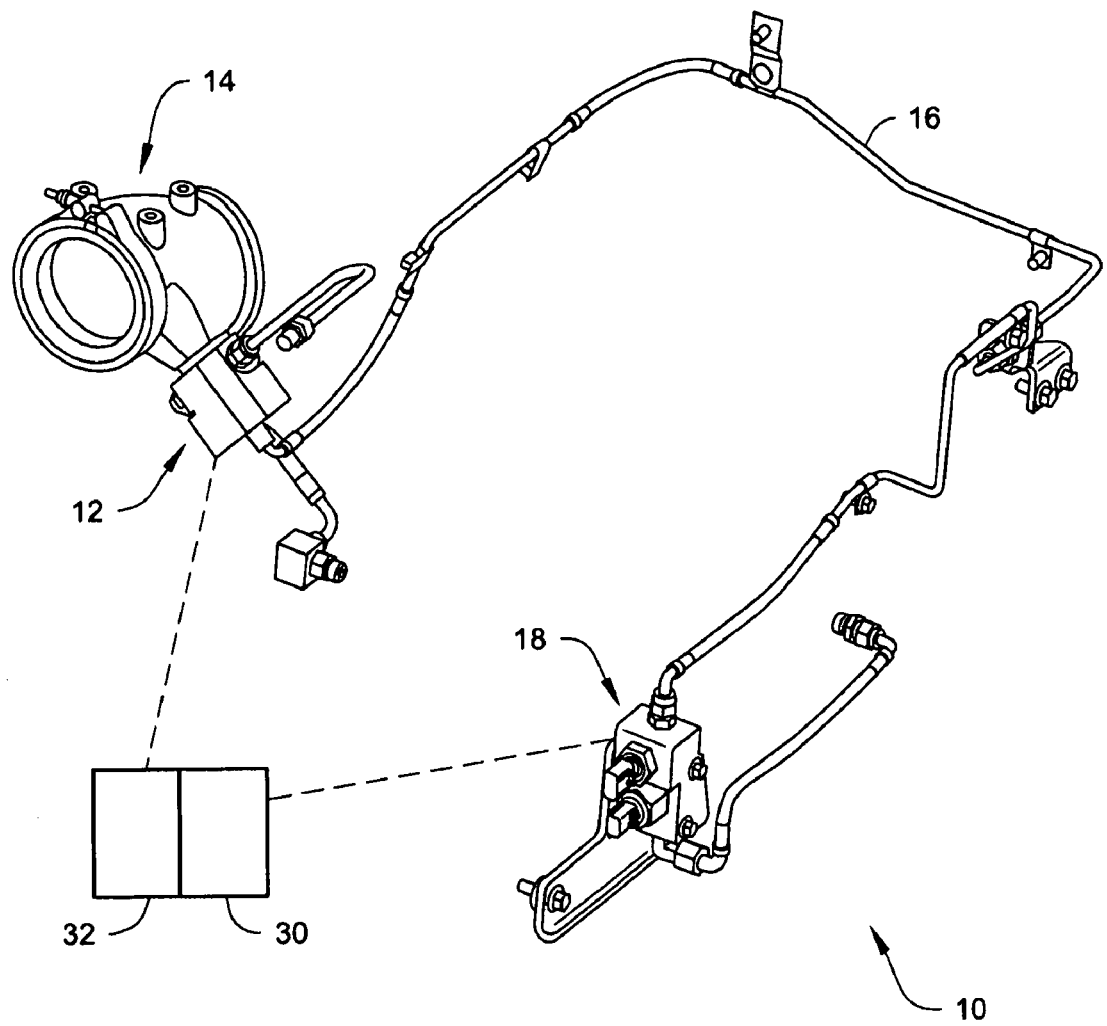
FIG. 1 illustrates an exemplary doser system that can implement the real time doser efficiency monitoring method.

With reference to FIG. 1, a doser system 10 for an exhaust gas aftertreatment system is illustrated. For sake of convenience in describing the unique concepts, this description will describe the doser system 10 as being a hydrocarbon doser system for a diesel fuel engine that injects diesel fuel into exhaust gas from the engine. However, it is to be realized that the unique concepts described herein can be applied to other doser systems that inject other types of dosing agents.

The basic configuration and operation of the doser system 10 and aftertreatment system are well known to persons of ordinary skill in the art. The doser system 10 includes a doser injector 12 that is connected to an exhaust gas connection tube 14 connected to the exhaust from an engine (not illustrated). As part of the aftertreatment system, exhaust gases in the connection tube 14 flow to a diesel oxidation catalyst (DOC) device that is intended to react with the exhaust gas to convert nitric oxide to nitrogen dioxide. A diesel particulate filter (DPF) is provided downstream of the DOC to remove soot or particulate matter from the exhaust flow.

The doser injector 12 is configured and arranged to inject a dosing agent, which in this exemplary embodiment is diesel fuel, into the exhaust gas in the tube 14 to increase the temperature of the DOC. The fuel is supplied via a fuel supply line 16. A shut-off valve assembly 18 is connected to the supply line 16 and is configured and arranged to control the flow of fuel in the supply line 16 and to the doser injector 12.

Figure 2:
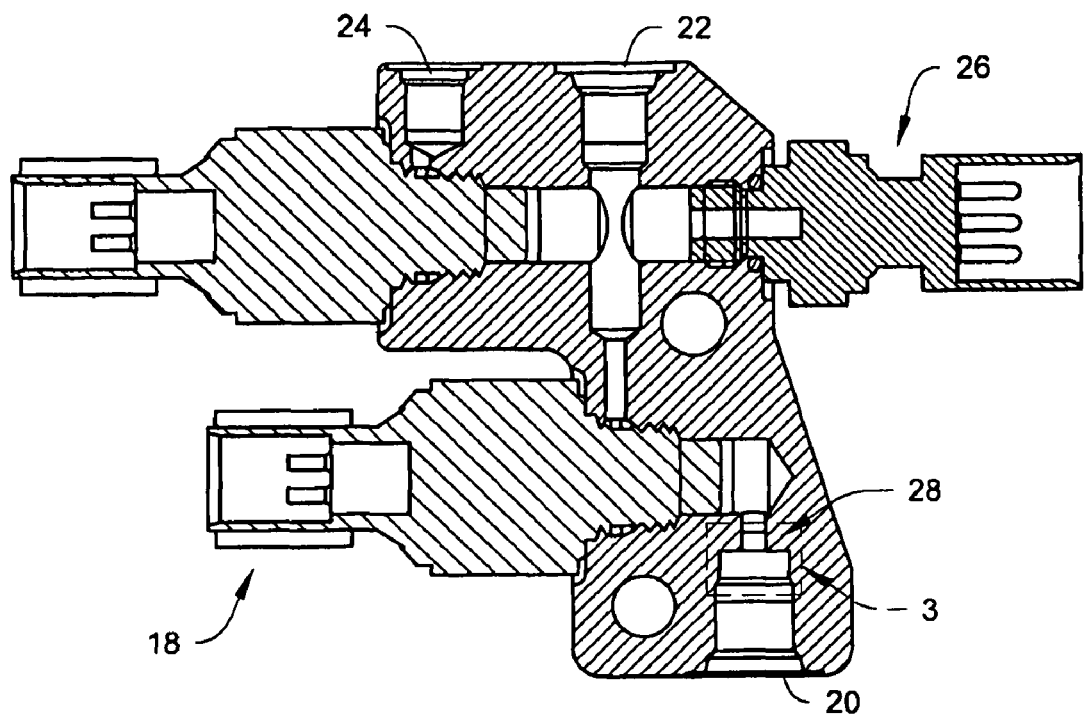
FIG. 2 illustrates the shut-off valve assembly.
Figure 3:
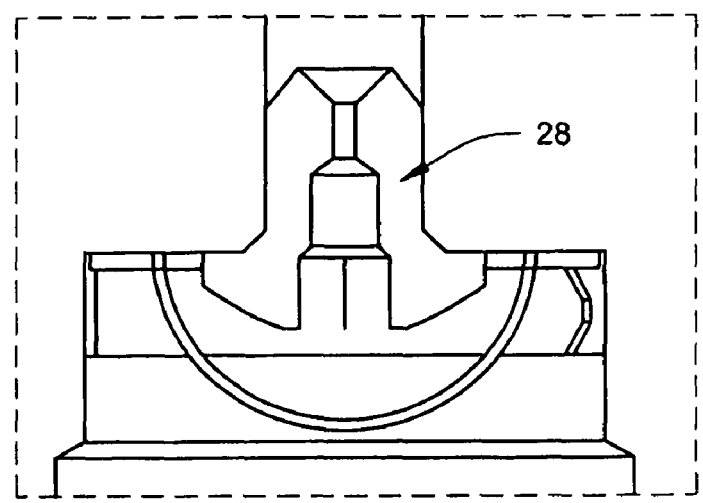
FIG. 3 is detailed view of the portion in box 3 of FIG. 2 illustrating the trim orifice in the shut-off valve assembly.

Details of the shut-off valve assembly 18 are illustrated in FIGS. 2 and 3. The assembly 18 includes a fuel inlet port 20, a fuel outlet port 22 connected to the supply line 16, and a drain port 24. A pressure sensor 26 connected to the valve assembly 18 senses fuel pressure in the assembly 18. A trim orifice 28 is provided to keep the fuel pressure in the assembly 18 more stable. The construction and operation of the valve assembly 18 illustrated in FIGS. 2 and 3 are conventional.

Returning to FIG. 1, a controller 30 is connected to the pressure sensor 26 and receives pressure readings therefrom. The controller 30 monitors the efficiency of the doser injector 12 by determining the average instant pressure difference of the fuel at the shut-off valve assembly 18 within one duty cycle of the doser injector which is pulse-width modulation (PWM) controlled. The controller 30, which can be an electronic control module (ECM), can also control the aftertreatment system. The doser injector 12 is controlled by a separate PWM controller 32.

Figure 4:
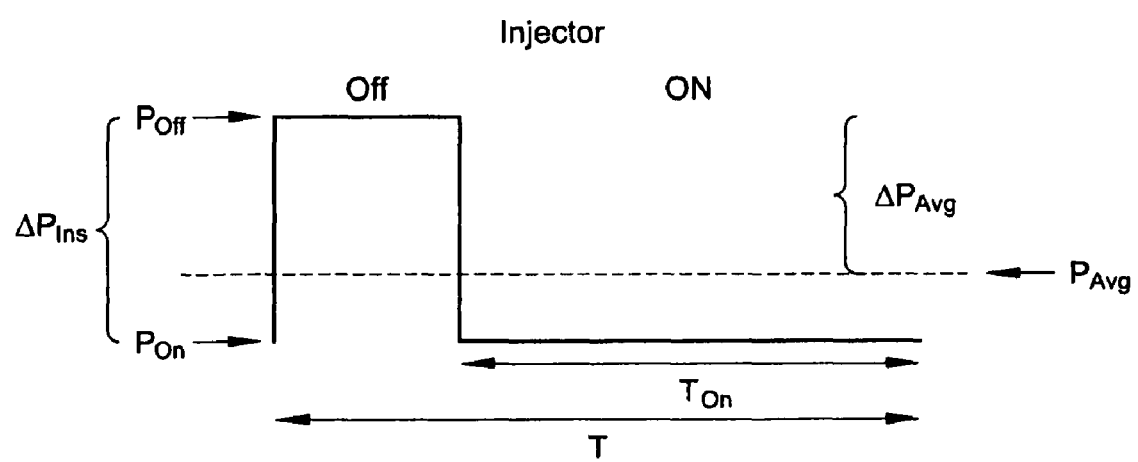
FIG. 4 depicts a pressure reading over one cycle period of the doser injector.
Figure 5:
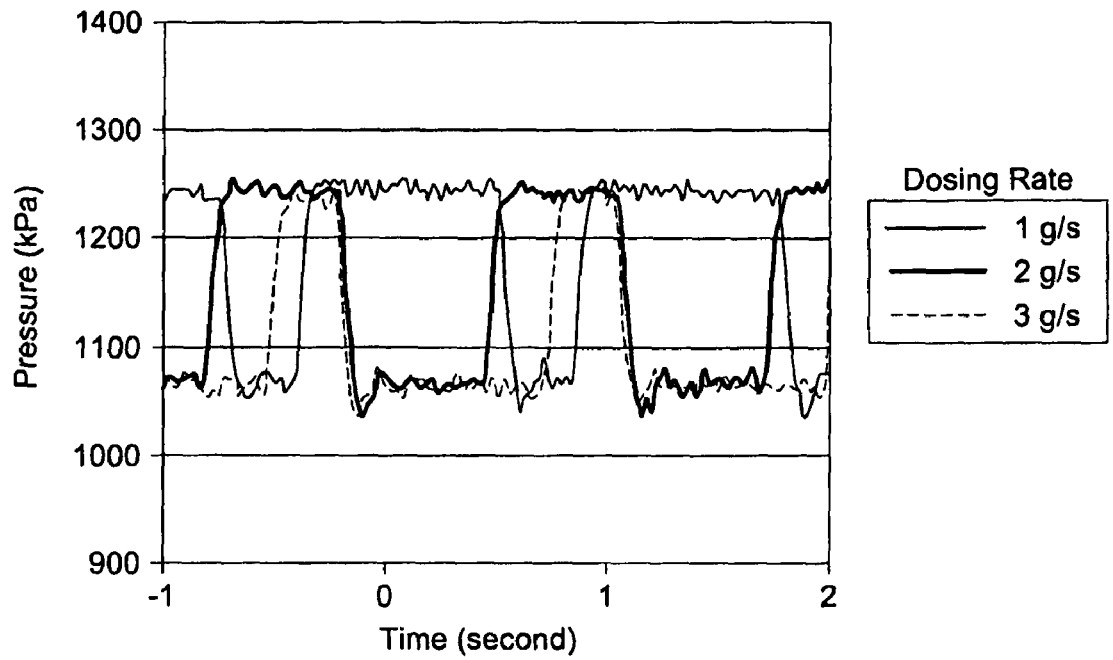
FIG. 5 is a graph of the dosing agent pressure versus time at different dosing rates.
Figure 6:
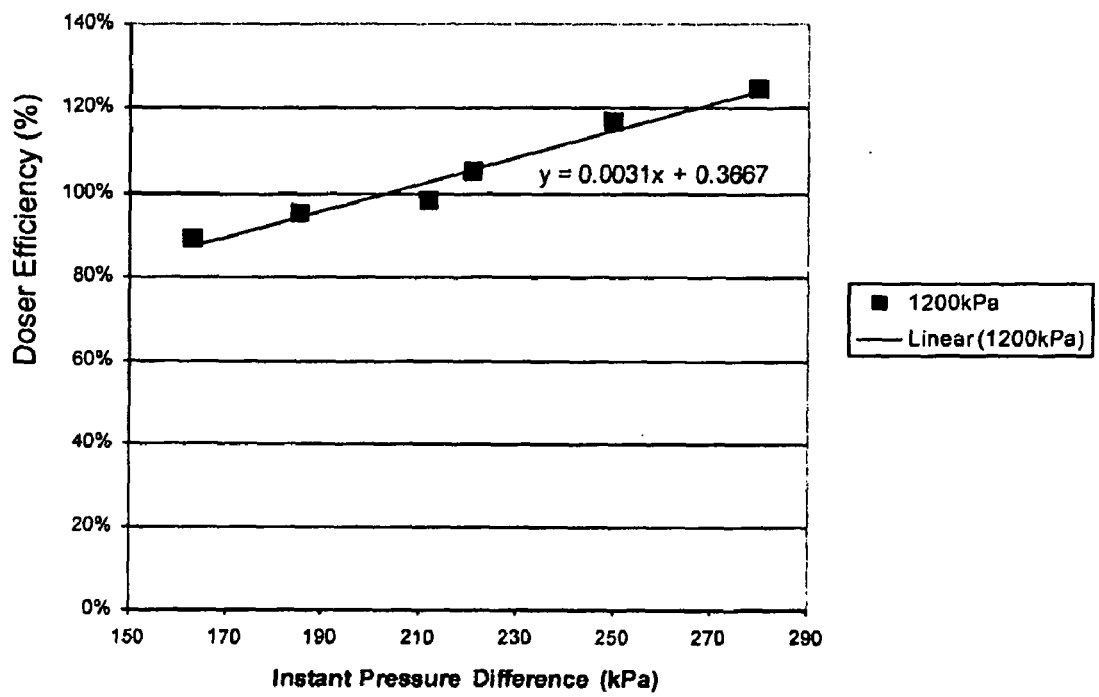
FIG. 6 is a graph of the doser efficiency versus instant pressure difference for 6 doser injectors with differing deterioration levels.
Figure 7:
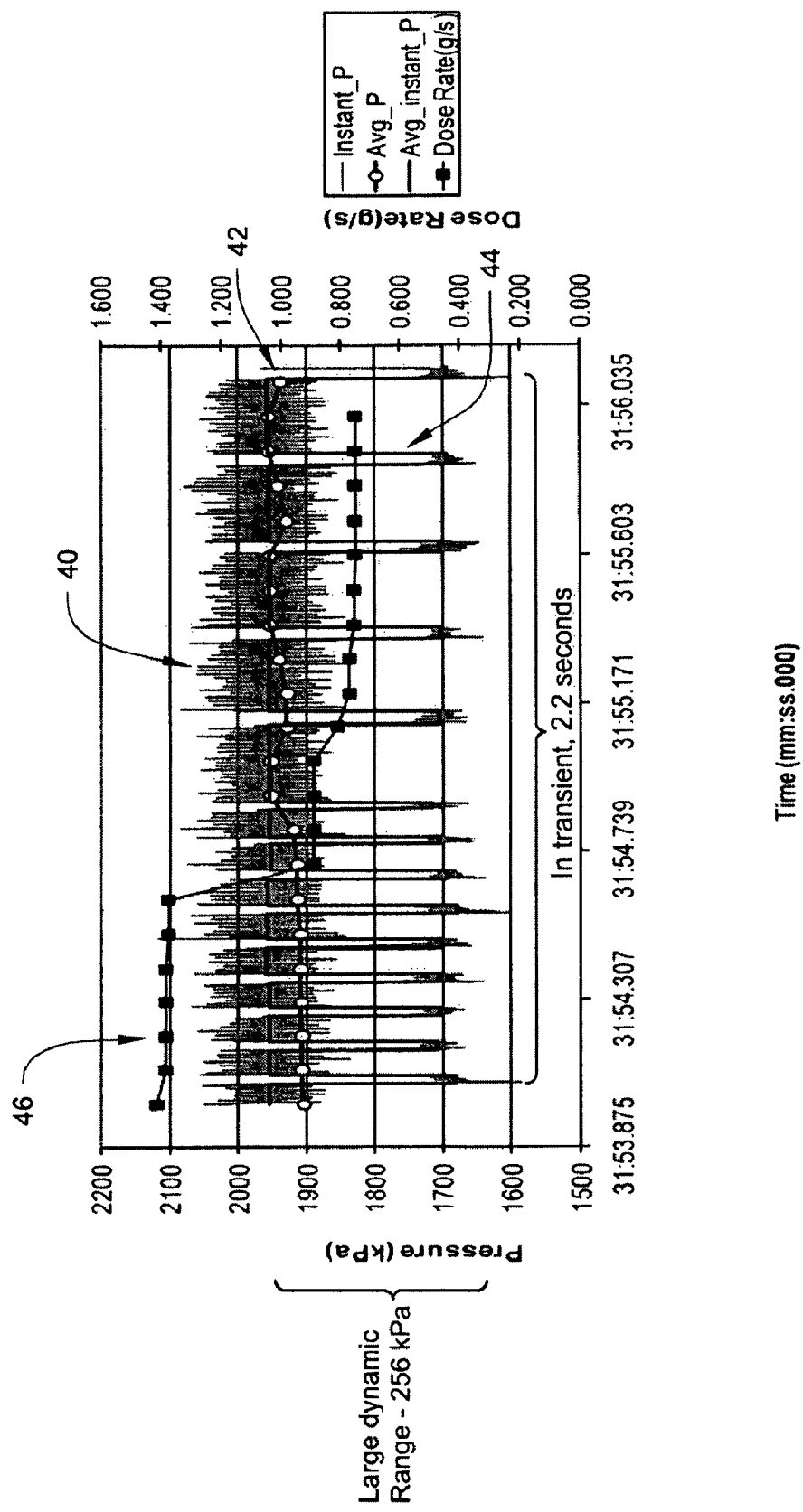
FIG. 7 is a graph of dosing agent pressure and dosing rate versus time.

The fuel dosing rate is controlled by the duty cycle of the PWM controller. FIG. 4 shows one cycle period T of doser pressure, with $P_{off}$ and $P_{on}$ being the fuel pressure measured by the pressure sensor 26 when the doser injector is turned off and on, respectively. All references to pressure herein and the pressures shown in FIGS. 5-7 are the fuel pressure measured by the pressure sensor 26 in the valve assembly 18. $P_{avg}$ is the average pressure when the doser injects fuel at that duty cycle, calculated as follows:

$$P_{avg} = \frac{P_{on} \cdot T_{on} + P_{off} \cdot (T - T_{on})}{T} \quad (Eq. 1)$$
$$= P_{on} \cdot R_{DC} + P_{off} \cdot (1 - R_{DC})$$

where $$R_{DC} = \frac{T_{on}}{T} \text{ Radio of duty cycle}$$

The average pressure difference, $\Delta P_{avg}$, can be calculated as follows:

$$\Delta P_{avg} = P_{off} - P_{avg} \quad (Eq. 2)$$
$$= P_{off} - P_{on} \cdot R_{DC} - P_{off} \cdot (1 - R_{DC})$$
$$= (P_{off} - P_{on}) \cdot R_{DC}$$
$$= \Delta P_{ins} \cdot R_{DC}$$

The average instant pressure difference, $\Delta P_{ins}$, is the average pressure difference by a factor of duty cycle. The average instant pressure difference is substantially independent of dosing rate. This is evident from FIG. 5 which depicts a graph of dosing agent pressure versus time at different dosing rates. From FIG. 5, it can be seen that the instant pressure difference (i.e. the difference between the maximum pressure $P_{off}$ and the minimum pressure $P_{on}$) remains substantially constant even with dosing rate changes.

FIG. 6 is a graph of the doser efficiency versus average instant pressure difference for 6 doser injectors with differing deterioration levels. From this graph, it can be determined that under the conditions set forth (e.g. at a supply pressure of about 1200 kPa) in the graph, a 10 kPa variation in instant pressure difference means approximately a 3.1% doser efficiency error. It is believed by the inventors that this level of accuracy is not achievable by doser efficiency monitoring methods in existence at the time of filing this application.

FIG. 7 is a graph depicting pressure measurements when the fuel dose rate changes from about 1.4 g/s to about 0.8 g/s within 2.2 seconds at a supply pressure of about 1950 kPa. The graph plots the individual instant pressure readings 40 versus time, the average pressure 42 versus time, the average instant pressure 44 versus time, and the dose rate 46 versus time.

First, looking at the average instant pressure difference method described herein, relying upon the average instant pressure difference within a single duty cycle eliminates duty cycle error. In addition, the average instant pressure difference method relies upon a relatively large range of instant pressure difference, shown in FIG. 7 as about 256 kPa, over the single duty cycle. This helps to minimize the impact of pressure variations on the doser efficiency. From FIG. 7, the average instant pressure 44 while the doser is off holds relatively steady at about 1950 kPa, which is the assumed supply pressure. The variation in instant pressure difference while the doser injector is on varies by about 10 kPa. Assuming that the doser used in FIG. 7 is a 100% efficient doser, and assuming that a 100% efficiency doser at 1950 kPa supply pressure has an instant pressure difference of 256 kPa, then the doser efficiency error can be determined by taking the variation in instant pressure difference, 10 kPa, and dividing it by the pressure difference range of 256 kPa. The doser efficiency error for the average instant pressure difference method is thus about 3.9%.

In contrast, looking at the instant pressure 40 and the average pressure 42, one doser efficiency monitoring method in existence at the time of filing this application relies upon the average pressure 42 to determine doser efficiency. In the average pressure difference method, the dynamic range of the average pressure difference is the dynamic range of the pressure difference multiplied by a factor of duty cycle. In FIG. 7, the duty cycle is about 0.15 seconds. The dynamic range of the average pressure difference (i.e. the maximum average pressure minus the minimum average pressure) is about 38.5 kPa. This is a much smaller range than the average instant pressure difference method which means that pressure variations have a much greater impact on the doser efficiency. Relying on the same assumptions in the preceding paragraph, and assuming that the variation in instant pressure difference while the doser injector is on varies by about 10 kPa as above, the doser efficiency error of the average pressure difference method is 10 kPa divided by 38.5 kPa, or about 27.5%. If one factors in duty cycle error, that error becomes even larger.

Although the average instant pressure difference method has been described with respect to diesel fuel as the dosing agent, the concepts described herein can be applied to other dosing agents. For example, the dosing agent can be one or more of other types of fuels including hydrocarbon fuels, or other dosing agents such as alcohols, urea, ammonia, and natural gas.

The monitoring method described herein can be implemented in a number of different ways. For example, the monitoring method can be implemented by software residing in an aftertreatment system controller, for example in the controller 30. Alternatively, the monitoring method can be implemented by hardware such as electronic circuitry at or near the pressure sensor 26.

The concepts described herein may be embodied in other forms without departing from its spirit or characteristics. The described embodiments are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of monitoring efficiency of a doser injector that is configured and arranged to inject a dosing agent into exhaust gas, comprising:
    determining an average instant pressure difference of the dosing agent within a duty cycle of the doser injector, wherein determining the average instant pressure difference of the dosing agent includes using a pressure sensor to measure the pressure of the dosing agent when the doser injector is off and when the doser injector is on; and
    using the determined average instant pressure difference of the dosing agent to determine the efficiency of the doser injector.

2. The method of claim 1, wherein the doser injector is pulse width modulation controlled.

3. The method of claim 1, wherein determining the average instant pressure difference includes determining the average pressure when the doser injector is off, and determining the average pressure when the doser injector is on.

4. The method of claim 1, wherein the method is implemented by software in a controller.

5. The method of claim 1, wherein the method is implemented by hardware adjacent a shut-off valve assembly.

6. A method of monitoring efficiency of a doser injector that is configured and arranged to inject a dosing agent into exhaust gas, comprising:
    in a single duty cycle of the doser injector: determining an average pressure of the dosing agent when the doser injector is off and determining an average pressure of the dosing agent when the doser injector is on, wherein determining the average pressures includes using a pressure sensor to measure the pressure of the dosing agent when the doser injector is off and when the doser injector is on, and
    determining the difference between the average pressure when the doser injector is off and the average pressure when the doser injector is on, to derive an average instant pressure difference.

7. The method of claim 6, further comprising multiplying the difference by a duty cycle ratio to derive an average pressure difference.

8. The method of claim 6, wherein the doser injector is pulse width modulation controlled.

9. The method of claim 6, wherein the exhaust gas is exhaust gas from a vehicle engine, and the doser injector is connected to an exhaust gas aftertreatment system that includes a diesel oxidation catalyst.

10. The method of claim 6, wherein the dosing agent comprises hydrocarbon fuel, natural gas, alcohol, urea, or ammonia.

11. The method of claim 6, wherein the method is implemented by software in a controller.

12. The method of claim 6, wherein the method is implemented by hardware adjacent a shut-off valve assembly.

13. The method of claim 6, further comprising using the average instant pressure difference to determine the doser efficiency.

14. A doser system, comprising:
    a doser injector that is configured and arranged to inject a dosing agent into exhaust gas;
    a dosing agent supply line connected to the doser injector;
    a dosing agent shut-off valve assembly connected to the supply line that is configured and arranged to control the flow of the dosing agent in the supply line and to the doser injector, the valve assembly including a pressure sensor for detecting dosing agent pressure in the valve assembly; and
    a controller that monitors efficiency of the doser injector, the controller determining an average instant pressure difference of the dosing agent within a duty cycle of the doser injector, the controller is connected to the pressure sensor to receive therefrom dosing agent pressure readings at the shut-off valve assembly when the doser injector is off and dosing agent pressure readings at the shut-off valve assembly when the doser injector is on.

15. The doser system of claim 14, wherein the doser injector is pulse width modulation controlled.

16. The doser system of claim 14, wherein the dosing agent comprises hydrocarbon fuel, natural gas, alcohol, urea, or ammonia.

17. The doser system of claim 14, wherein the shut-off valve assembly includes a dosing agent inlet port with a trim orifice.

* * * * *